US012780423B2

(12) United States Patent
Wilson et al.

(10) Patent No.: US 12,780,423 B2
(45) Date of Patent: Nov. 3, 2026

(54) MECHANICAL SPRING STRUT WITH WEIGHT-BASED SPRING SELECTOR

(71) Applicant: B/E Aerospace, Inc., Winston-Salem, NC (US)

(72) Inventors: Christopher M. Wilson, Clemmons, NC (US); Javier Valdes De La Garza, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 295 days.

(21) Appl. No.: 18/626,735

(22) Filed: Apr. 4, 2024

(65) Prior Publication Data

US 2025/0313338 A1 Oct. 9, 2025

(51) Int. Cl.
*B64D 11/06* (2006.01)
*F16F 1/12* (2006.01)

(52) U.S. Cl.
CPC .............. *B64D 11/064* (2014.12); *F16F 1/12* (2013.01)

(58) Field of Classification Search
CPC ................................. B64D 11/064; F16F 1/12
See application file for complete search history.

(56) References Cited

U.S. PATENT DOCUMENTS

| | | | | |
|---|---|---|---|---|
| 3,171,643 | A | 3/1965 | Wilfried | |
| 3,862,751 | A | 1/1975 | Schwaller | |
| 6,401,886 | B1 * | 6/2002 | Liang ................ | A63B 21/0083 267/225 |
| 7,281,704 | B2 | 10/2007 | Salice | |
| 10,259,584 | B2 | 4/2019 | Oleson et al. | |
| 11,236,797 | B2 | 2/2022 | Bandy | |
| 2005/0067828 | A1 | 3/2005 | Norton | |
| 2016/0146284 | A1 | 5/2016 | Yan et al. | |
| 2017/0043876 | A1 * | 2/2017 | Oleson .................. | A47C 7/345 |

* cited by examiner

*Primary Examiner* — David R Dunn
*Assistant Examiner* — Tania Abraham
(74) *Attorney, Agent, or Firm* — Suiter Swantz IP

(57) ABSTRACT

A mechanical spring strut including a cylinder, a first spring disposed in the cylinder, a barrel slidably disposed in the cylinder and engaging one end of the first spring, and a rod subassembly including a rod slidably disposed in the barrel, pins rotatable into and out of contact with the barrel, a second spring disposed in the rod, and a plunger slidably disposed in the rod and engaging the second spring. In use, exceeding a predefined compression threshold of the second spring rotates the pins into contact with the barrel thereby causing continued movement of the rod to compress the first spring. Uses of the mechanical spring strut include, but are not limited to, passenger seating and weight sensing applications.

20 Claims, 8 Drawing Sheets

MECHANICAL SPRING STRUT WITH WEIGHT-BASED SPRING SELECTOR

TECHNICAL FIELD AND BACKGROUND

The present disclosure relates generally to a strut assembly, and more particularly, to a mechanical spring strut including a weight-based spring selector for use in passenger seating and other applications.

Various types of passenger seats are configured to adjust between different sitting positions. In aircraft, safety requirements mandate that passenger seats are positioned upright in preparation for taxi, takeoff, and landing (TTOL). During flight, passenger seats may adjust to a reclined sitting position to enhance comfort. Traditional passenger seats recline by rotating the seat back to decrease the seat back angle. Some traditional passenger seats may also synchronize seat back and seat bottom motions to further enhance recline comfort.

In manual passenger seats, it is desirable to assist the seat in returning to the upright sitting position. In traditional passenger seats, lift assistance is typically provided by a gas spring attached between a movable seat component and a fixed seat component, for instance the seat back and the seat frame. In use, the gas spring is compressed as the seat reclines thereby storing potential energy, and extends as the seat returns upright thereby releasing stored energy to provide lift assistance.

Passenger weight may vary greatly between the 5th percentile female weight passenger and the 95th percentile male weight passenger. As such, a traditional gas spring having a single, non-adjustable spring rate may be incapable of providing a desirable amount of lift assistance for passengers at the extreme ends of the weight spectrum. For example, while a very light passenger may underutilize the performance capability of a traditional gas spring, a very heavy passenger may overcome the performance capability of a traditional gas spring.

Accordingly, what is needed is a mechanical spring strut with variable performance for use in passenger seating and other applications.

BRIEF SUMMARY

According to one aspect, the inventive concepts according to the present disclosure are directed to a mechanical spring strut including a cylinder having a first end and a second end, a first compression spring disposed in the cylinder, a barrel slidably disposed in the cylinder and engaging one end of the first compression spring, and a rod subassembly slidably disposed in the cylinder. In embodiments, the rod subassembly includes a rod axially disposed in the first compression spring and slidably disposed in the barrel, diametrically opposed pins rotatable between a first position disengaging the barrel and a second position engaging one end of the barrel, a second compression spring disposed in the rod, and a plunger slidably disposed in the rod and engaging one end of the second compression spring. In use, the diametrically opposed pins are positioned in the first position by default, when a predefined threshold compression of the second compression spring is exceeded the plunger engages the diametrically opposed pins to cause the diametrically opposed pins to rotate from the first position to the second position to engage one end of the barrel such that continued movement of the rod compresses the first compression spring, and when the predefined threshold compression of the second compression spring is not exceeded the diametrically opposed pins remain in the first position and the rod slides relative to the barrel without compressing the first compression spring.

In some embodiments, the first compression spring has a first spring rate and the second compression spring has a second spring rate different from the first spring rate.

In some embodiments, each of the first end and the second end of the cylinder are open such that the rod is extendable through each of the first end and the second end.

In some embodiments, the first compression spring is concentrically disposed in the cylinder, the barrel is concentrically disposed in the first compression spring, and the rod is concentrically disposed in the barrel.

In some embodiments, in use, the second compression spring is compressed first until the predefined threshold amount of compression of the second compression spring is exceeded, and once the predefined threshold amount of compression is exceeded, the first compression spring is compressed.

In some embodiments, the predefined threshold amount of compression of the second compression spring corresponds to a predefined passenger weight.

In some embodiments, the predefined passenger weight is in a range from 140 lbs to 160 lbs, and more preferably about 150 lbs.

According to another aspect, the inventive concepts according to the present disclosure are directed to a passenger seat assembly adjustable between an upright sitting position and a reclined sitting position. In embodiments, the passenger seat assembly includes a seat frame, a seat back, a seat pan coupled to the seat back for synchronous motion, a mechanical spring strut for assisting the passenger seat assembly in returning to the upright sitting position. In embodiments, the mechanical spring strut includes a cylinder attached to the seat frame, a first compression spring disposed in the cylinder, a barrel slidably disposed in the cylinder, engaging one end of the first compression spring, and attached at one end to one of the seat back and the seat pan, and a plunger subassembly. In embodiments, the rod subassembly includes a rod axially disposed in the first compression spring and slidably disposed in the barrel, diametrically opposed pins rotatable between a first position disengaging the barrel and a second position engaging one end of the barrel, a second compression spring disposed in the rod, and a plunger slidably disposed in the rod and engaging one end of the second compression spring. In use, the diametrically opposed pins are positioned in the first position by default, when a predefined threshold compression of the second compression spring is exceeded the plunger engages the diametrically opposed pins to cause the diametrically opposed pins to rotate from the first position to the second position to engage one end of the barrel such that continued movement of the rod compresses the first compression spring, and when the predefined threshold compression of the second compression spring is not exceeded the diametrically opposed pins remain in the first position and the rod slides relative to the barrel without compressing the first compression spring.

According to a further aspect, the inventive concepts according to the present disclosure are directed to a passenger seat assembly adjustable between an upright sitting position and a reclined sitting position. In embodiments, the passenger seat assembly includes a seat frame, a seat back, a pivoting seat pan coupled to the seat back for synchronous motion, a primary gas spring attached between the seat frame and the seat back, a secondary gas spring attached between the seat frame and the seat back, one end of the secondary gas spring slidably disposed in an elongated guideway, a mechanical spring strut attached between the seat frame and the pivoting seat pan, a movable locking pin, and a cable attached to the mechanical spring strut and the movable locking pin. In use, when a predefined threshold compression of the mechanical spring strut is not exceeded the movable locking pin is disengaged from the elongated guideway thereby allowing the one end of the secondary gas spring to travel along the elongated guideway as the passenger seat adjusts between the upright sitting position and the reclined sitting position, and when the predefined threshold compression of the mechanical spring strut is exceeded the movable locking pin is engaged with the elongated guideway thereby locking the one end of the secondary gas spring relative to the seat frame as the passenger seat adjusts between the upright sitting position and the reclined sitting position.

In some embodiments, the primary gas spring provides lift assistance to the seat back regardless of a position of the movable locking pin, when the movable locking pin is disengaged from the elongated guideway the secondary gas spring does not provide lift assistance to the seat back, and when the movable locking pin is engaged with the elongated guideway the secondary gas spring provides lift assistance to the seat back.

In some embodiments, the locking pin is associated with a magnet magnetically attracted to spaced components of the seat frame.

In some embodiments, the movable locking pin engages transverse to the elongated guideway.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
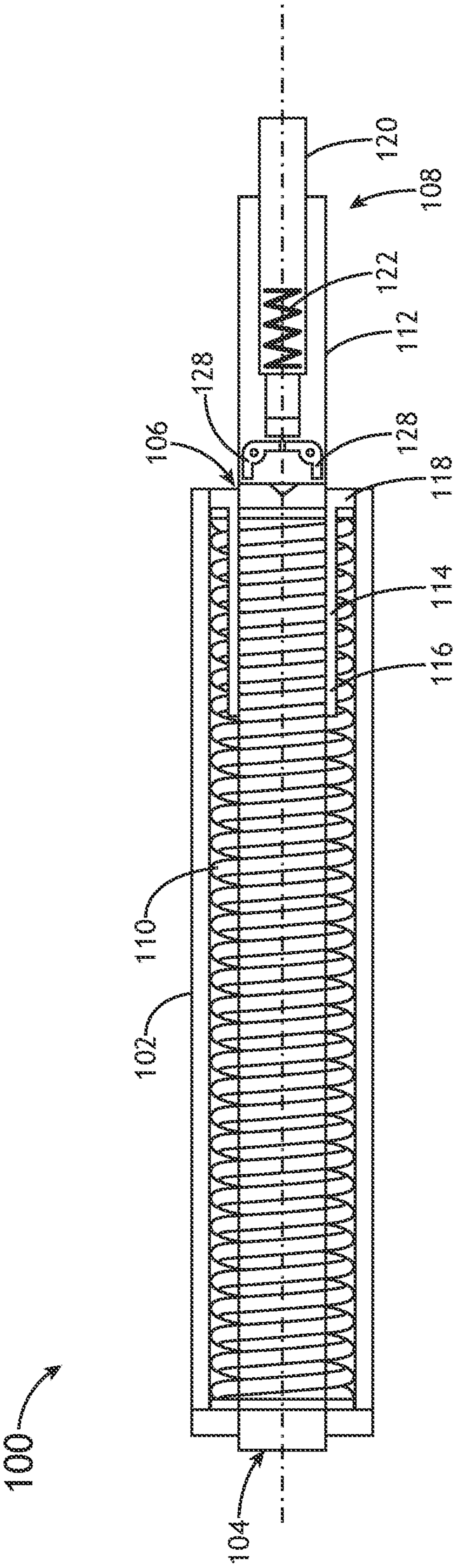
FIG. 1 is a longitudinal cross-sectional view of a mechanical spring strut, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a mechanical spring strut assembly including selectively activated internal springs. In embodiments, a rod is configured to stroke relative to a cylinder. A first spring is disposed in the cylinder and a barrel is positioned at one end of the first spring. A second spring is disposed in the rod. A plunger is slidable disposed in the rod and engages one end of the second spring. Features provided on the rod are configured to rotate in an out of contact with the barrel such that, when the features are out of contact with the barrel the rod translates relative to the barrel without activating the first spring, and when the features are in contact with the barrel the rod translation activates the first spring.

In use, the rod translates axially relative to the cylinder when force is applied to one end of the rod, for instance weight from a passenger when the mechanical spring strut assembly is implemented in a passenger seat application. When the force (e.g., passenger weight) is less than a predetermined threshold amount, the rod translates without activating (e.g., compressing) the first spring. When the force exceeds the predetermined threshold amount, the configuration of the assembly changes such that rod translation activates the first spring. In embodiments, at least one of the first spring and the second spring may be compressed to store energy when the rod strokes in a first direction, and release energy to provide lift assistance when the rod strokes in a second direction opposite the first direction. In embodiments, the barrel may be coupled with a further mechanism configured to be actuated when the barrel interacts with the rod. Thus, the assembly may be tuned to provide at least one of lift assistance and actuation of a further mechanism depending on the force (e.g., weight) applied to the rod. Such an assembly may be utilized in a passenger seat application, for example, as a weight-based sensing mechanism to determine an amount of lift assistance to be applied to return the passenger seat to an upright sitting position.

FIG. 1 illustrates a mechanical spring strut assembly 100 according to the present disclosure. The assembly 100 generally includes a cylinder 102 having a first open end 104 and a second open end 106. A rod subassembly 108 is slidably disposed in the cylinder 102, for instance concentrically disposed in the cylinder 102, and is configured to translate axially (e.g., stroke) relative to the cylinder 102. A first end of the rod subassembly 108 is extendable through the first open end 104 of the cylinder 102, and a second end of the rod subassembly 108 is extendable through the second open end 106 of the cylinder 102.

A first spring 110 is disposed in the cylinder, for instance a helical compression spring concentrically disposed in the interior space formed in the cylinder 102. One end of the first spring 110 is seated against the inside of the first open end 104. In use as described below, the first spring 110 is compressible in a direction of the first end 104. The rod subassembly 108 includes a rod 112 axially disposed in the first spring 110. A barrel 114 is further disposed in the cylinder 102, for instance concentrically disposed in the cylinder 102. The barrel 114 is positioned proximal to the second open end 106. In embodiments, the barrel 114 includes a hollow, elongated cylindrical portion 116 disposed in the first spring 110 and an annular flange 118 positioned at one end of the elongated cylindrical portion 116. The annular flange 118 is positioned against one end of the first spring 110 such that axial movement of the barrel 114 toward the first open end 104 causes the first spring 110 to compress.

Figure 2:
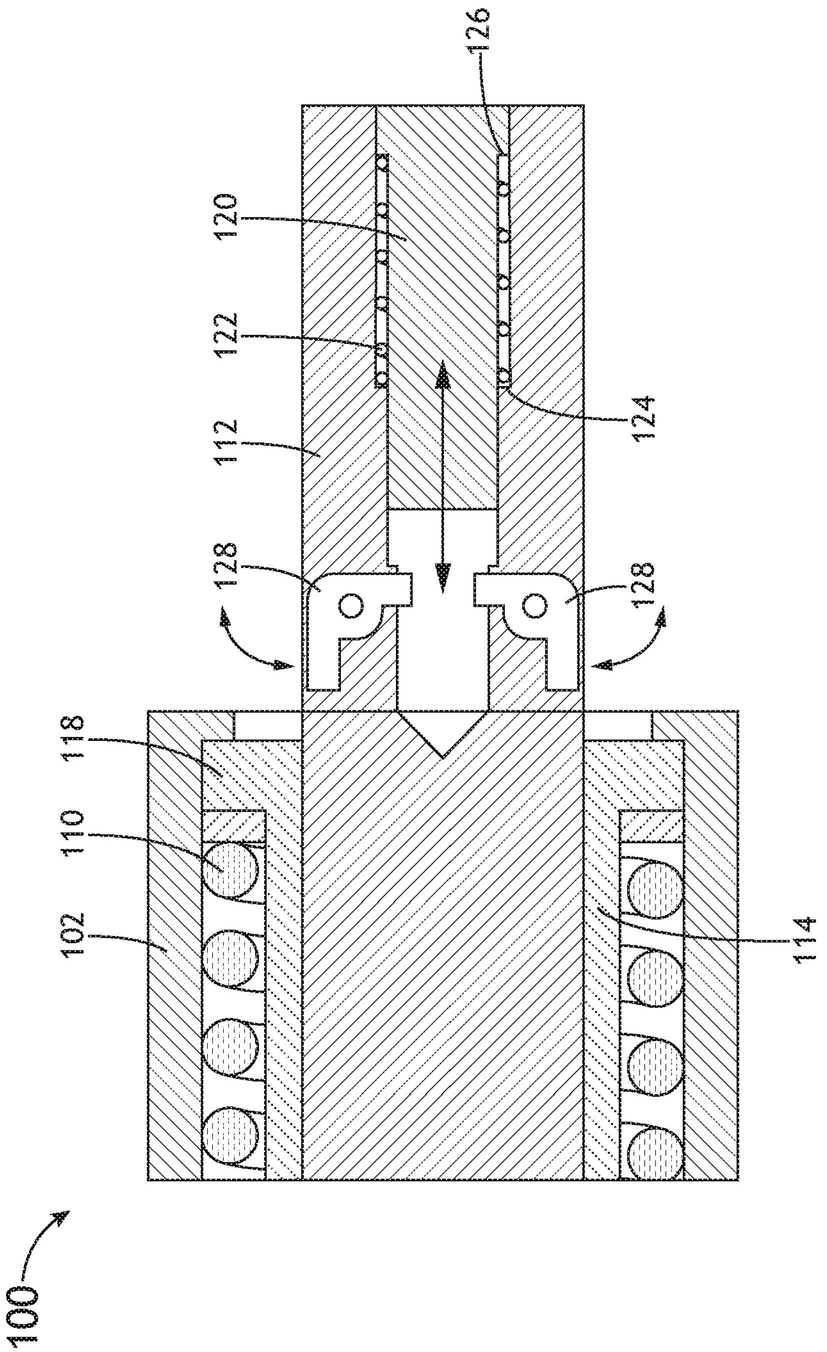
FIG. 2 is a detailed view of the mechanical spring strut, in accordance with example embodiments of this disclosure.

FIGS. 1 and 2 illustrate details of the assembly 100, and particularly the configuration of the rod assembly 108 and interface with the barrel 114. The rod subassembly 108 is axially disposed in the barrel 114. In use as described below, the rod subassembly 108 is configured to translate axially relative to the stationary barrel 114, or may cause the barrel 114 to translate along with the rod subassembly 108 during at least part of the translation motion of the rod subassembly 108, depending on the operating state of the assembly 100. In embodiments, the rod subassembly 108 generally includes the rod 112, a plunger 120 axially disposed in one end the rod 112, and a second spring 122 biasing the plunger 120 away from the cylinder 102.

In embodiments, the plunger 120 is axially disposed through the second spring 122, and the second spring 122 is a helical compression spring having a first end engaging an annular shoulder 124 internal to the rod 112, and a second end engaging an annular shoulder 126 formed on the plunger 120. In use, the plunger 120 is configured to be advanced into the rod 112, and the second spring 122 is configured to bias the plunger 120 away from the cylinder 102. The rod 112 carries rotatable pins 128. In embodiments, the rotatable pins 128 includes two diametrically opposed rotatable pins 128. Each pin 128 is rotatable about an axis orthogonal or substantially orthogonal to the translation direction of each of the rod 112 and the plunger 120.

The pins 128 are arranged for synchronous (e.g., simultaneous) rotational motion between a first position in which the pins 128 are out of contact or engagement with the barrel 114, and a second position in which the pins 128 are in contact with or engage with the barrel 114. In embodiments, when the pins 128 are in the first position, the pins 128 are disposed internal to the rod 112 such that the rod 112 is able to axially translate relative to (e.g., within) the barrel 114 while the barrel remains stationary, and thus the barrel 114 does not act on the first spring 110. When the pins 128 are in the second position, at least part of each pin 128 extends beyond the outer circumferential surface of the rod 112 in order to engage the barrel 114, and particularly engage against the end of the annular flange 118 of the barrel 114.

The second spring 122 may be tuned with a predetermined threshold value such force on the plunger 120 less than the predetermined threshold value causes the second spring 122 to compress an amount insufficient to allow the plunger 120 to advance into the rod 112 into contact with the pins 128, and force on the plunger 120 exceeding the predetermined threshold value causes the second spring 122 to compress an amount sufficient to allow the plunger 120 to make contact with the pins 128 to cause the pins 128 to rotate outward into position to be able to make contact with the barrel 114 as the rod subassembly 108 advances into the cylinder 102. In other words, the resistance to compression of the second spring 122 determines the amount of force (e.g., passenger weight) needed to overcome the spring force to allow the first spring 110 to be activated by the axial translation of the rod subassembly 108.

Figure 3:
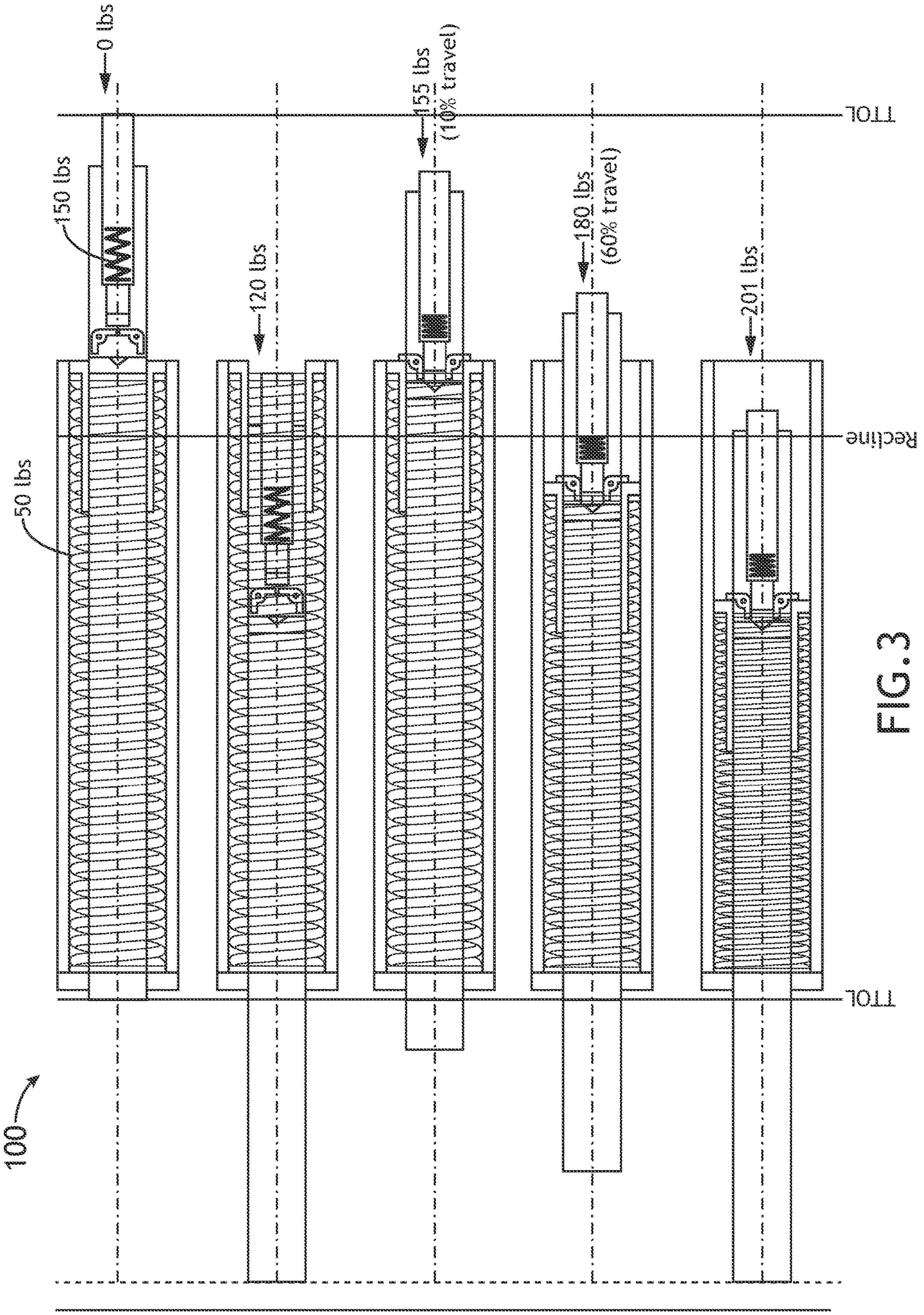
FIG. 3 is a comparative view showing the mechanical spring strut in various states of compression, in accordance with example embodiments of this disclosure.

FIG. 3 illustrates comparative views of the mechanical spring strut assembly 100 in various states of compression, in accordance with example embodiments of this disclosure. In the context of a reclinable passenger seat application, the assembly 100 may be implemented in connection with one or more of a mechanical weight-based sensing mechanism, lift assistance mechanism, recline mechanism, etc. In the context of a reclinable passenger seat, the passenger seat may be adjustable between an upright sitting position for taxi, takeoff, and landing (TTOL) and a recline sitting position during flight, and the two springs may be tuned to have different spring rates.

In a particular conceived example, the first spring may be tuned to about 150 lbs of passenger weight whereas the second spring may be tuned to about 50 lbs of passenger weight. These weights are exemplary only and should not be construed as limiting. As shown in the top illustration, no weight is acting on the plunger and therefore the rod subassembly is in the default state and no spring is compressed. As shown in the second-from-the-top illustration, the weight applied to the plunger is less than the threshold 150 lbs and therefore the rod subassembly is advanced into the cylinder without compressing the first spring. In the third-from-the-top illustration, the weight on the plunger is 155 lbs thus exceeding the 150 lbs threshold and thereby causing the second spring to compress an amount to rotate the pins into engagement with the barrel and the first spring to compress slightly. In the fourth-from-the-top illustration, the weight on the plunger is 180 lbs thus exceeding the 150 lbs threshold and thereby causing the second spring to compress an amount to rotate the pins into engagement with the barrel and the first spring to compress more than the third-from-the-top illustration. In the bottom illustration, the weight on the plunger is 201 lbs and thus exceeding the 150 lbs threshold of the second spring and the 50 lbs capacity of the first spring. As shown, the amount of linear translation of the rod assembly may be controlled by the tuning and relationship of the first and second springs.

FIGS. 4-8 illustrate another particular conceived example of use of the mechanical spring strut assembly in a weight-based seating application in connection with lift assistance for returning a passenger seat to an upright sitting position in preparation for TTOL. In embodiments, a passenger seat 130 such as an aircraft passenger seat may include a seat frame 132 supporting a seat back 134 and a seat pan 136. In embodiments, the seat back 134 and the seat pan 136 may be coupled for synchronous motion between and upright sitting position for TTOL and a reclined sitting position for flight. The seat frame 132 may include elements such as spreaders, transverse beams, legs, etc. Elements such as guides and guideways formed in the spreaders may control seat component motions.

Figure 4:
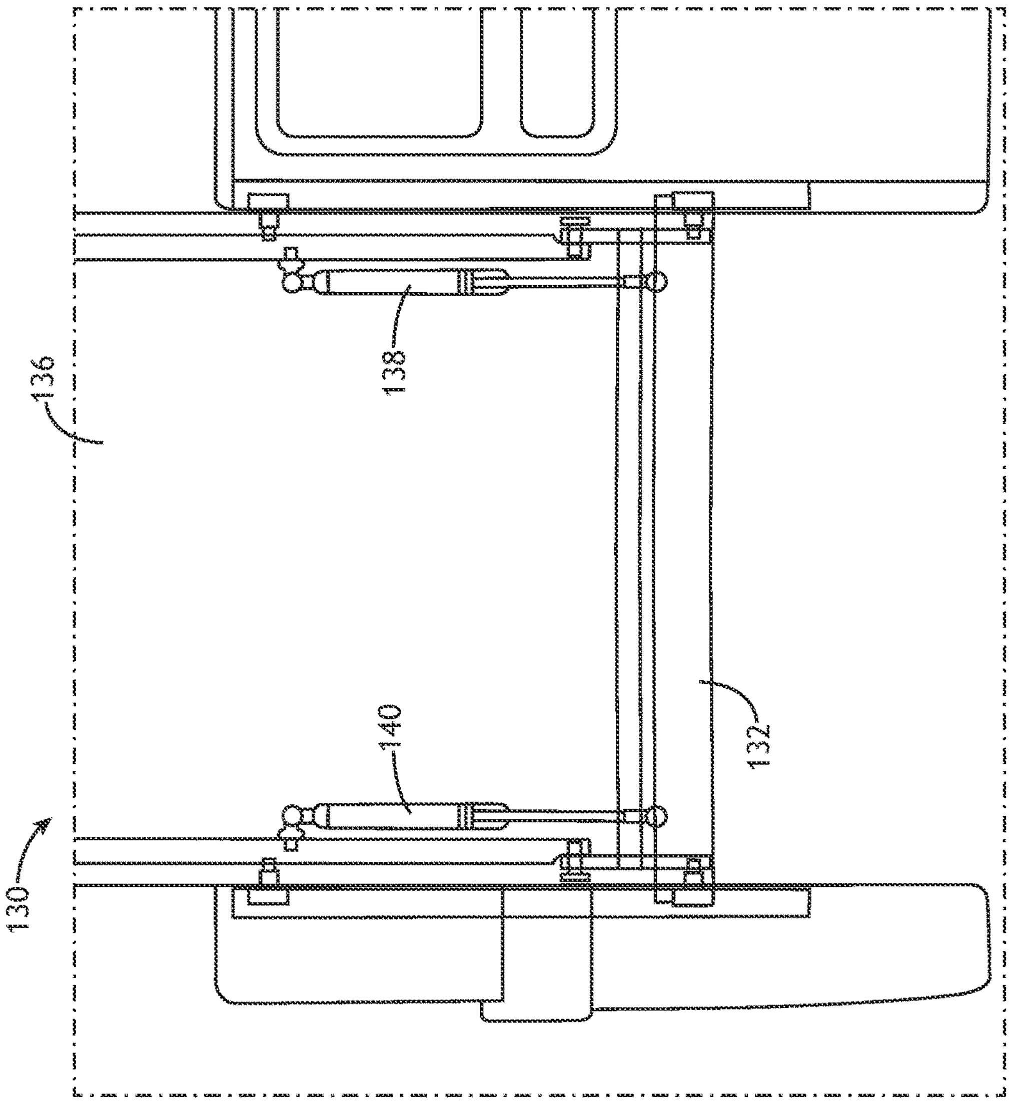
FIG. 4 is a rear elevation view of a passenger seat assembly, in accordance with example embodiments of this disclosure.

With reference to FIG. 4, the passenger seat 130 includes a primary gas spring 138 attached between the seat frame 132 and the seat back 136, and a secondary a secondary gas spring 140 attached between the seat frame 132 and the seat back 136. In embodiments, the primary gas spring 138 may be positioned on one side of the passenger seat 130 and operate to provide continuous lift assistance, whereas the second gas spring 140 may be provided on the opposite side of the passenger seat 130 to provide supplemental lift assistance as described below. In embodiments, one end of the primary gas spring 138 is rotatably attached to the seat frame 132 while the other end of the primary gas spring 138 is rotatably attached to a frame element of the seat back 136. In use, when the seat back 136 is rotated to the reclined position, the primary gas spring 138 is compressed to store energy used to provide lift assistance for returning the seat back 136 to the upright sitting position. Locking and unlocking the primary gas spring 138 may be accomplished using a traditional mechanism including a manual actuator (e.g., located in the armrest) coupled to a Bowden-style cable for allowing the seat back 136 to be moved.

Figure 5:
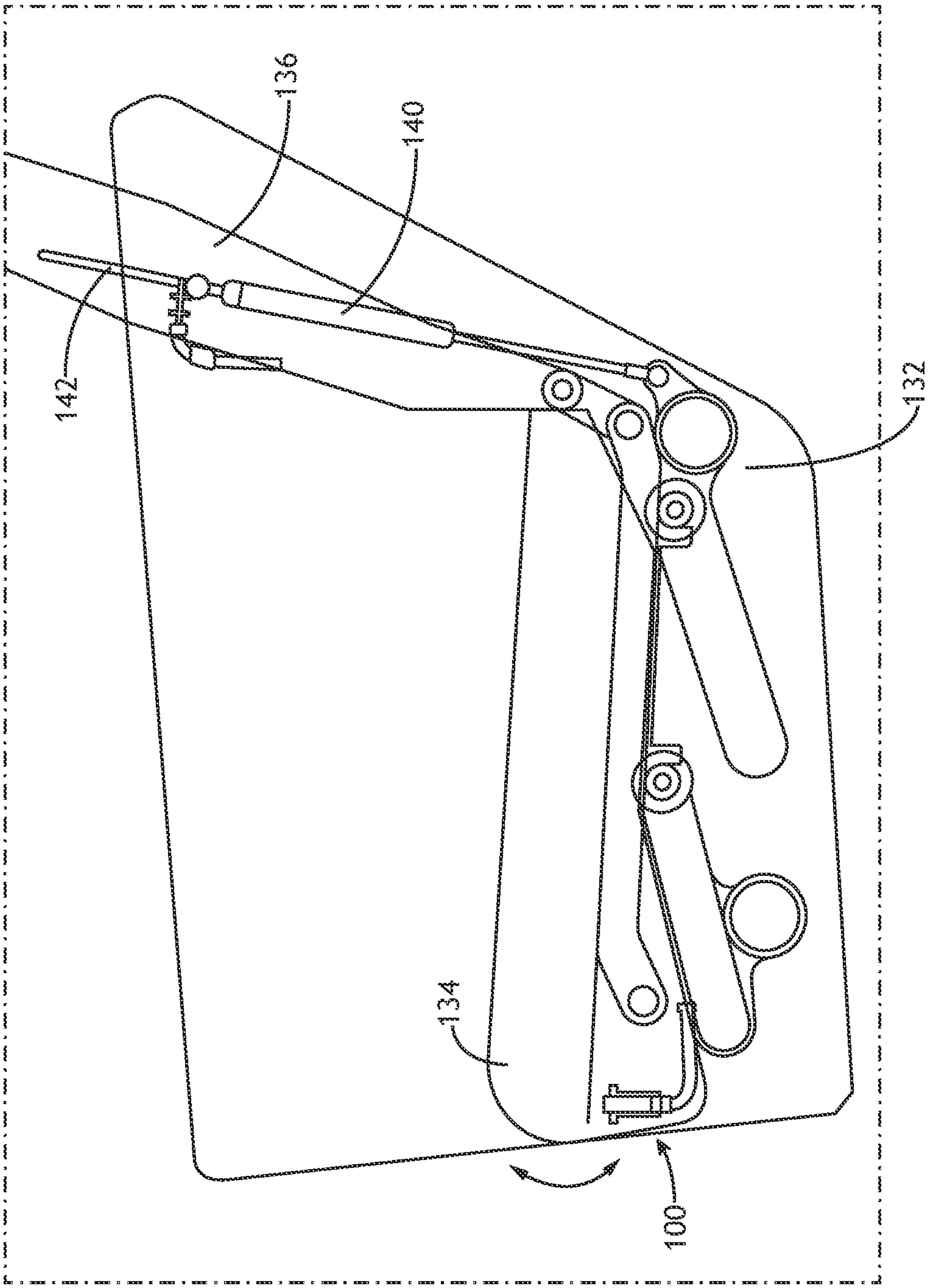
FIG. 5 is a side elevation view of a passenger seat shown in an upright sitting position, in accordance with example embodiments of this disclosure.

With reference to FIG. 5, one end of the secondary gas spring 140 may be rotatably attached to the seat frame 136, while the opposing end of the secondary gas spring 140 may be slidably disposed in an elongated guideway 142. In embodiments, the guideway 142 is formed in a frame element of the seat back 136, is linear, and is oriented substantially vertical considering the substantially vertical orientation of the seat back 136. In a first operating condition in which supplemental lift assistance is not needed, the opposing end of the secondary gas spring 140 is free to travel along the length of the guideway 142 as the seat back 136 rotates between the upright sitting position and the reclined sitting position, such that the secondary gas spring 140 is not compressed to store energy when the seat back 136 reclines, and does not operate to provide lift assistance when the seat back 136 returns upright. In other words, in the first operating condition, motion of the opposing end of the secondary gas spring 140 is unconstrained.

Figure 6:
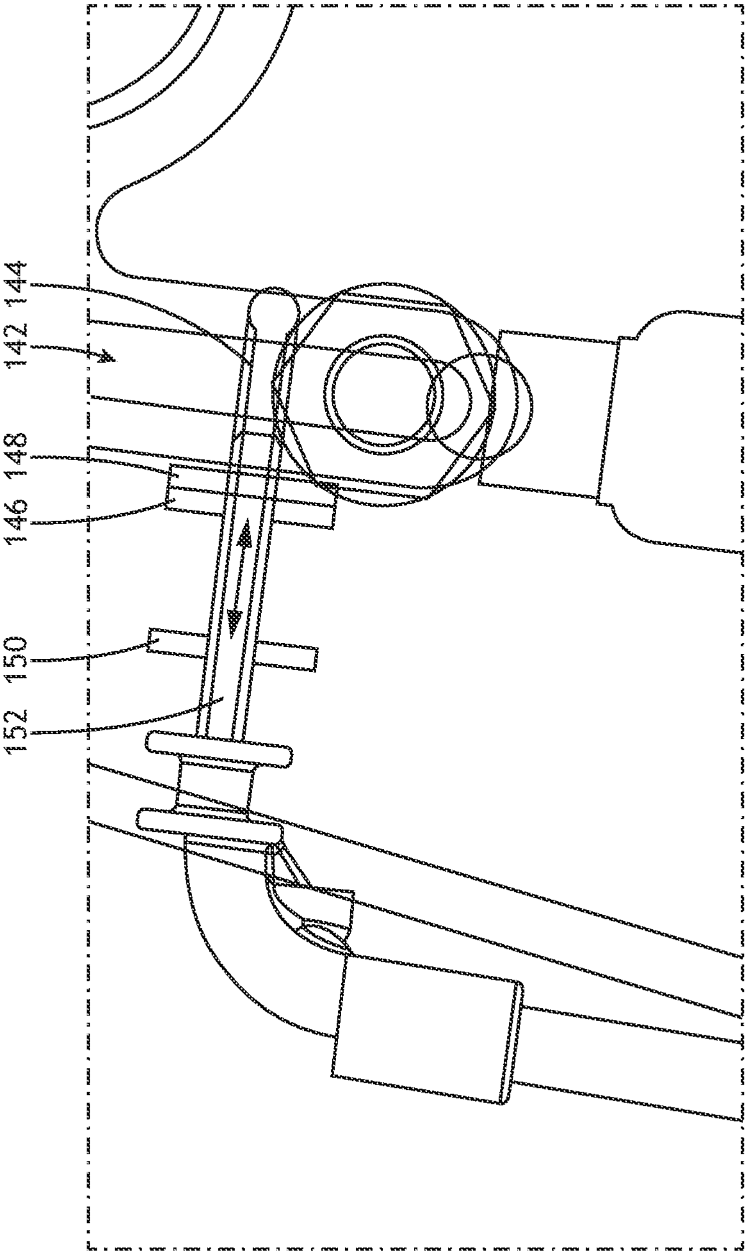
FIG. 6 is a detailed showing a release mechanism associated with a supplemental gas spring, in accordance with example embodiments of this disclosure.

With reference to FIG. 6, in a secondary operating condition, motion of the opposing end of the secondary gas spring 140 is constrained such that the secondary gas spring 140 provides supplemental lift assistance to help the primary gas spring return the seat upright (i.e., the primary and secondary gas springs 138, 140 both provide lift assistance). As shown, when in a constrained state, a locking pin 144 extends transverse across the guideway 142 to maintain the opposing end of the second gas spring 140 at one end (e.g., the bottom end) of the guideway 142. When constrained, the opposing end of the secondary gas spring 140 is prevented from translating along the guideway 142 as the seat back 136 reclines. Thus, as the seat back 136 reclines, the secondary gas spring 140 compresses to store energy used to assist the seat back 136 in returning to upright. In embodiments, when constrained, the 'upper' ends of the primary and secondary gas springs 138, 140 may be axially aligned such that their compressions are coordinated and synchronous when the seat back 136 is reclined.

In embodiments, a magnet 146 may be mounted to the locking pin 144. In use, the magnet 146 may be magnetically attracted to a first component 148 to maintain the locking pin 144 in a 'locked' condition extending transverse across the guideway 142, and magnetically attracted to a second component 150 to maintain the locking pin 144 in an 'unlocked' condition out of the guideway 142. In embodiments, the locking pin 144 may be mounted to the end of a pulling cable 152 or the pulling cable 152 may terminate in the locking pin 144.

With reference to FIG. 5, the pulling cable 152 may be a Bowden-style cable translatably disposed in a sheath and having a remote end attached to the mechanical spring strut assembly 100. In embodiments, the mechanical spring strut assembly 100, or portions thereof, may be utilized in connection with a pivoting seat pan 134 to provide a mechanical weight-based sensing mechanism for lift assistance. The assembly 100 may be positioned proximal to the forward end of the pivoting seat pan 134 with the plunger 120 oriented upward to engage the bottom of the seat pan 134. In use, the seat pan 134 may be configured to rotate downward from the weight of the passenger sitting on the seat, thereby depressing the plunger 120.

Figure 7:
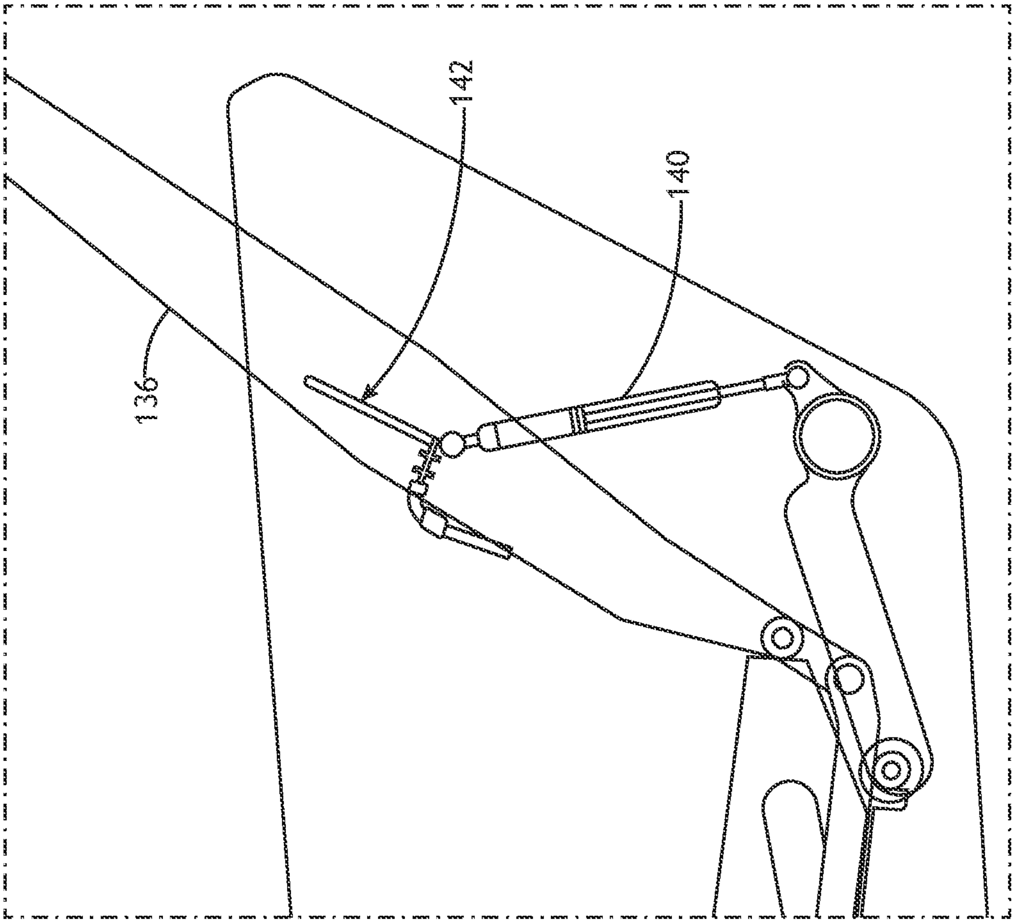
FIG. 7 is a side elevation view showing a passenger seat in a fully reclined state and with a supplemental gas spring activated, in accordance with example embodiments of this disclosure.

With reference to FIG. 7, when the weight of the passenger exceeds the predetermined threshold of the second spring, the plunger causes the pins to rotate outward into contact with the barrel, thereby causing the barrel to translate. In embodiments, the barrel may be coupled to one end of the pulling cable or an intermediate mechanism coupled to the cable. In use, when the passenger weight is sufficient to move the barrel, the pulling cable is translated in a first direction to engage the locking pin in the 'locked' position thereby constraining motion of the end of the secondary gas spring 140 within the guideway 142 to provide supplemental lift assistance to the lift assistance already provided by the primary gas spring. Thus, as the seat back 136 reclines, the secondary gas spring 140 is compressed to store energy used for supplemental lift assistance.

Figure 8:
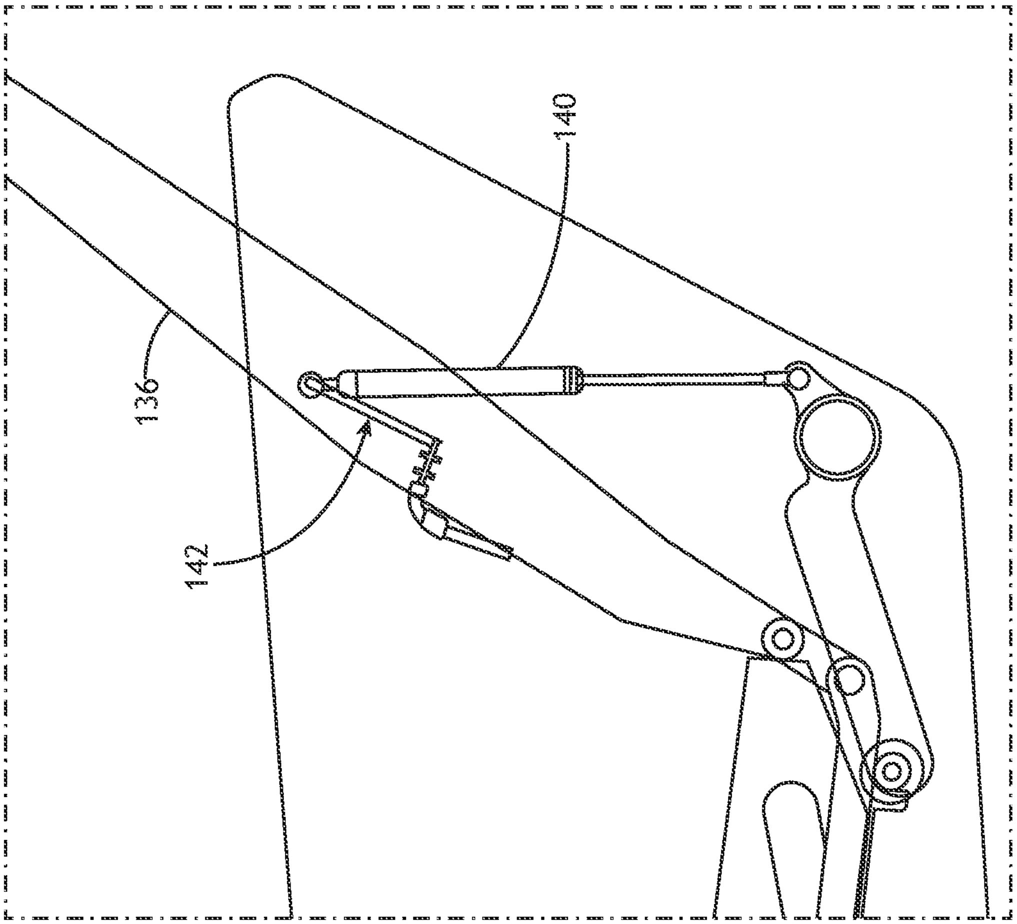
FIG. 8 is a side elevation view showing a passenger seat in a fully reclined state and with a supplemental gas spring deactivated, in accordance with example embodiments of this disclosure.

With reference to FIG. 8, when the weight of the passenger does not exceed the predetermined threshold of the second spring, the plunger does not cause the pins to rotate outward into contact with the barrel, and thus the barrel does not translate. The configuration shown in FIG. 8 may correspond to the default configuration in which the locking pin is positioned apart from the guideway 142 such that the one end of the secondary gas spring 140 is unconstrained and can travel along the guideway 142 as the seat back 136 rotates. When unconstrained, the secondary gas spring 140 does not provide supplemental lift assistance and the lift assistance relies on the primary gas spring.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A mechanical spring strut, comprising:
- a cylinder having a first end and a second end;
- a first compression spring disposed in the cylinder;
- a barrel slidably disposed in the cylinder, wherein a portion of the barrel is disposed in the first compression spring and one end of the barrel engages one end of the first compression spring; and
- a rod subassembly including:
  - a rod axially disposed in the first compression spring and slidably disposed in the barrel;
  - diametrically opposed pins rotatable between a first position in which the diametrically opposed pins disengage the one end of the barrel, and a second position in which the diametrically opposed pins engage the one end of the barrel;
  - a second compression spring disposed in the rod; and
  - a plunger slidably disposed in the rod and engaging one end of the second compression spring;
- wherein, in use:
- the diametrically opposed pins are positioned in the first position by default;
- when a predefined threshold compression of the second compression spring is exceeded, the plunger engages the diametrically opposed pins to cause the diametrically opposed pins to rotate from the first position to the second position to engage the one end of the barrel such that continued movement of the rod compresses the first compression spring; and
- when the predefined threshold compression of the second compression spring is not exceeded, the diametrically opposed pins remain in the first position and the rod slides relative to the barrel without compressing the first compression spring.

2. The mechanical spring strut according to claim 1, wherein the first compression spring has a first spring rate and the second compression spring has a second spring rate different from the first spring rate.

3. The mechanical spring strut according to claim 1, wherein each of the first end and the second end of the cylinder are open such that the rod is extendable through each of the first end and the second end.

4. The mechanical spring strut according to claim 1, wherein:
- the first compression spring is concentrically disposed in the cylinder;
- the portion of the barrel is concentrically disponed in the first compression spring; and
- the rod is concentrically disposed in the barrel.

5. The mechanical spring strut according to claim 1, wherein, in use:
- the second compression spring is compressed first until the predefined threshold amount of compression of the second compression spring is exceeded; and
- once the predefined threshold amount of compression is exceeded, the first compression spring is compressed.

6. The mechanical spring strut according to claim 1, wherein the predefined threshold amount of compression of the second compression spring corresponds to a predefined passenger weight acting on the mechanical spring strut.

7. The mechanical spring strut according to claim 6, wherein the predefined passenger weight is in a range from 140 lbs to 160 lbs.

8. A passenger seat assembly adjustable between an upright sitting position and a reclined sitting position, comprising:
- a seat frame;
- a seat back;
- a seat pan coupled to the seat back for synchronous motion; and
- a mechanical spring strut including:
  - a cylinder attached to the seat frame;
  - a first compression spring disposed in the cylinder;
  - a barrel slidably disposed in the cylinder, engaging one end of the first compression spring, and attached at one end to one of the seat back and the seat pan; and
  - a rod subassembly including:
    - a rod axially disposed in the first compression spring and slidably disposed in the barrel;
    - diametrically opposed pins rotatable between a first position disengaging the barrel and a second position engaging one end of the barrel;
    - a second compression spring disposed in the rod; and
    - a plunger slidably disposed in the rod and engaging one end of the second compression spring;
- wherein, in use:
  - the diametrically opposed pins are positioned in the first position by default;
  - when a predefined threshold compression of the second compression spring is exceeded, the plunger engages the diametrically opposed pins to cause the diametrically opposed pins to rotate from the first position to the second position to engage one end of the barrel such that continued movement of the rod compresses the first compression spring; and
  - when the predefined threshold compression of the second compression spring is not exceeded, the diametrically opposed pins remain in the first position and the rod slides relative to the barrel without compressing the first compression spring.

9. The passenger seat assembly according to claim 8, wherein the first spring has a first spring rate and the second spring has a second spring rate different from the first spring rate.

10. The passenger seat assembly according to claim 8, wherein each of the first end and the second end of the cylinder are open such that the rod can be extended through each of the first end and the second end.

11. The passenger seat assembly according to claim 8, wherein:
- the first compression spring is concentrically disposed in the cylinder;
- the barrel is concentrically disposed in the first compression spring; and
- the rod is concentrically disposed in the barrel.

12. The passenger seat assembly according to claim 8, wherein the predefined threshold amount of compression of the second compression spring corresponds to a predefined passenger weight.

13. The passenger seat assembly according to claim 12, wherein the predefined passenger weight is in a range from 140 lbs to 160 lbs.

14. A passenger seat assembly adjustable between an upright sitting position and a reclined sitting position, comprising:
- a seat frame;
- a seat back;
- a pivoting seat pan coupled to the seat back for synchronous seat back and seat pan motion;
- a primary gas spring attached between the seat frame and the seat back;
- a secondary gas spring attached between the seat frame and the seat back, one end of the secondary gas spring slidably disposed in an elongated guideway;
- a mechanical spring strut attached between the seat frame and the pivoting seat pan;
- a movable locking pin; and
- a cable attached to the mechanical spring strut and the movable locking pin;
- wherein, in use:
- when a predefined threshold compression of the mechanical spring strut is not exceeded, the movable locking pin is disengaged from the elongated guideway thereby allowing the one end of the secondary gas spring to travel along the elongated guideway as the passenger seat adjusts between the upright sitting position and the reclined sitting position; and
- when the predefined threshold compression of the mechanical spring strut is exceeded, the movable locking pin is engaged with the elongated guideway thereby locking the one end of the secondary gas spring relative to the seat frame as the passenger seat adjusts between the upright sitting position and the reclined sitting position.

15. The passenger seat assembly according to claim 14, wherein:
- the primary gas spring is provides lift assistance to the seat back regardless of a position of the movable locking pin;
- when the movable locking pin is disengaged from the elongated guideway, the secondary gas spring does not provide lift assistance to the seat back; and
- when the movable locking pin is engaged with the elongated guideway, the secondary gas spring provides lift assistance to the seat back.

16. The passenger seat assembly according to claim 14, wherein the mechanical spring strut comprises:
- a cylinder attached to the seat frame and having a first end and a second end;
- a first compression spring disposed in the cylinder;
- a barrel slidably disposed in the cylinder, engaging one end of the first compression spring, and attached to one end of the cable; and
- a rod subassembly including:
  - a rod axially disposed in the first compression spring and slidably disposed in the barrel;
  - diametrically opposed pins rotatable between a first position disengaging the barrel and a second position engaging one end of the barrel;
  - a second compression spring disposed in the rod; and
  - a plunger slidably disposed in the rod, one end of the plunger engaging one end of the second compression spring, and an opposing end of the plunger positioned in contact with the pivoting seat pan;
- wherein, in use:
- the diametrically opposed pins are positioned in the first position by default;
- when a predefined threshold amount of compression of the second compression spring is exceeded, the plunger engages the diametrically opposed pins to cause the diametrically opposed pins to rotate from the first position to the second position to engage one end of the barrel such that continued movement of the rod compresses the first compression spring thereby actuating the cable to engage the locking pin in the elongated guideway; and
- when the predefined threshold amount of compression of the second compression spring is not exceeded, the diametrically opposed pins remain in the first position and the rod slides relative to the barrel without compressing the first compression spring and without actuating the cable.

17. The passenger seat assembly according to claim 14, wherein the predefined threshold compression of the mechanical spring strut corresponds to a passenger weight on the seat pan when in the upright sitting position.

18. The passenger seat assembly according to claim 17, wherein the passenger weight is in a range between 140 lbs and 160 lbs.

19. The passenger seat assembly according to claim 14, wherein the locking pin is associated with a magnet magnetically attracted to spaced components of the seat frame.

20. The passenger seat assembly according to claim 14, wherein the movable locking pin engages transverse to the elongated guideway.

* * * * *